(12) United States Patent
Moran

(10) Patent No.: US 9,716,791 B1
(45) Date of Patent: Jul. 25, 2017

(54) SYSTEMS AND METHODS FOR DETECTING AND REDUCING FRAUD IN A CONTACT CENTER

(71) Applicant: Avaya Inc., Basking Ridge, NJ (US)

(72) Inventor: Thomas Moran, Galway (IE)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 15/166,330

(22) Filed: May 27, 2016

(51) Int. Cl.
*H04M 3/00* (2006.01)
*H04M 5/00* (2006.01)
*H04M 3/51* (2006.01)
*H04L 29/06* (2006.01)

(52) U.S. Cl.
CPC ........ *H04M 3/5175* (2013.01); *H04L 65/608* (2013.01)

(58) Field of Classification Search
CPC .......................... H04M 3/5175; H04L 65/608
USPC ................. 379/265.03, 266.01, 309
See application file for complete search history.

(56) References Cited

U.S. PATENT DOCUMENTS

| | | | |
|---|---|---|---|
| 7,684,556 B1 | 3/2010 | Jaiswal | |
| 8,112,278 B2 | 2/2012 | Burke | |
| 8,654,937 B2 | 2/2014 | Agapi et al. | |
| 8,914,645 B2 | 12/2014 | Duncan | |
| 9,037,113 B2 | 5/2015 | Balasubramaniyan et al. | |
| 2007/0121824 A1 | 5/2007 | Agapi et al. | |
| 2012/0330765 A1* | 12/2012 | Fried | G06Q 20/206 705/18 |
| 2014/0254778 A1* | 9/2014 | Zeppenfeld | H04M 3/523 379/88.02 |
| 2014/0269366 A1* | 9/2014 | Torgersrud | H04L 65/605 370/252 |
| 2015/0133092 A1 | 5/2015 | Shaffer et al. | |
| 2016/0065732 A1* | 3/2016 | Davis | H04M 3/51 379/265.02 |

OTHER PUBLICATIONS

Nuance Communications, Inc.; "Analyzing voice to fight contact center fraud," May 28, 2015; http://www.nuance.com/ucmprod/groups/enterprise/@web-enus/documents/collateral/nc_033509.pdf.

Nice Systems Ltd.; "Real-Time Authentication & Fraud Prevention;" Feb. 2015; http://www.nice.com/optimizing-customer-engagements/Lists/Brochures/Real-Time%20Authentication%20%20Fraud%20Prevention%20-%20Brochure.pdf.

* cited by examiner

*Primary Examiner* — Quynh Nguyen
(74) *Attorney, Agent, or Firm* — Stevens & Showalter, LLP

(57) ABSTRACT

Detecting fraud in a contact center including receiving an incoming Real-Time Transport Protocol (RTP) media stream associated with a contact, and determining, based on a real-time biometric analysis of the incoming RTP media stream, that the contact is a potential fraudulent contact. The incoming RTP media stream comprises at least one of an audio stream or a video stream. At least one characteristic related to one or more of an audio quality or a video quality of the incoming RTP media stream is altered without altering any characteristics of an outgoing RTP media stream from the contact center to the potential fraudulent contact, and an altered incoming RTP media stream associated with the potential fraudulent contact is received. In some embodiments, at least one subsequent communications session is automatically scheduled and initiated and a subsequent incoming RTP media stream is received during each subsequent communications session.

20 Claims, 5 Drawing Sheets

SYSTEMS AND METHODS FOR DETECTING AND REDUCING FRAUD IN A CONTACT CENTER

BACKGROUND

The present disclosure relates generally to fraud detection and reduction in a contact center, and, more particularly, to identifying a risk of fraud within the contact center and taking action to reduce the risk.

To detect and reduce fraud, contact centers frequently employ one or more types of identity verification such as authentication based on analysis of biometric data. Biometric analysis methods typically include collecting biometric data such as voice patterns and facial features and authenticating a current contact by comparing the collected biometric data with stored biometric data associated with the contact. Because this comparison typically involves use of a threshold value for determining whether to flag a contact as potentially fraudulent, most biometric solutions still register at least some level of false positives and negatives. These inadequacies may allow a fraudulent contact to access information belonging to another customer and may delay or prevent a legitimate customer from obtaining the desired information or services. These drawbacks are particularly evident with newer customers for whom little or no biometric data exists and for other contacts with outdated biometric data.

BRIEF SUMMARY

One aspect of the present disclosure relates to a method for detecting fraud in a contact center. This method includes receiving, by a processor of the contact center, an incoming Real-Time Transport Protocol (RTP) media stream associated with a contact, and determining, by the processor of the contact center, based on a real-time biometric analysis of the incoming RTP media stream, that the contact is a potential fraudulent contact. The incoming RTP media stream comprises at least one of an audio stream or a video stream. The method also includes altering, by the processor of the contact center in real time, at least one characteristic related to one or more of an audio quality or a video quality of the incoming RTP media stream without altering any characteristics of an outgoing RTP media stream from the contact center to the potential fraudulent contact, and receiving, by the processor of the contact center, an altered incoming RTP media stream associated with the potential fraudulent contact.

Another aspect of the present disclosure relates to a system for detecting fraud in a contact center. This system includes a memory device, storing executable instructions, and a processor in communication with the memory device. In particular, the processor when executing the executable instructions: receives an incoming Real-Time Transport Protocol (RTP) media stream associated with a contact, in which the incoming RTP media stream comprises at least one of an audio stream or a video stream; determines, based on a real-time biometric analysis of the incoming RTP media stream, that the contact is a potential fraudulent contact; alters, in real time, at least one characteristic related to one or more of an audio quality or a video quality of the incoming RTP media stream without altering any characteristics of an outgoing RTP media stream from the contact center to the potential fraudulent contact; and receives an altered incoming RTP media stream associated with the potential fraudulent contact.

BRIEF DESCRIPTION OF THE DRAWINGS

So the manner in which the above recited features of the present disclosure may be understood in detail, a more particular description of embodiments of the present disclosure, briefly summarized above, may be had by reference to embodiments, which are illustrated in the appended drawings. It is to be noted, however, the appended drawings illustrate only typical embodiments encompassed within the scope of the present disclosure, and, therefore, are not to be considered limiting, for the present disclosure may admit to other equally effective embodiments, wherein.

DETAILED DESCRIPTION

Figure 1:
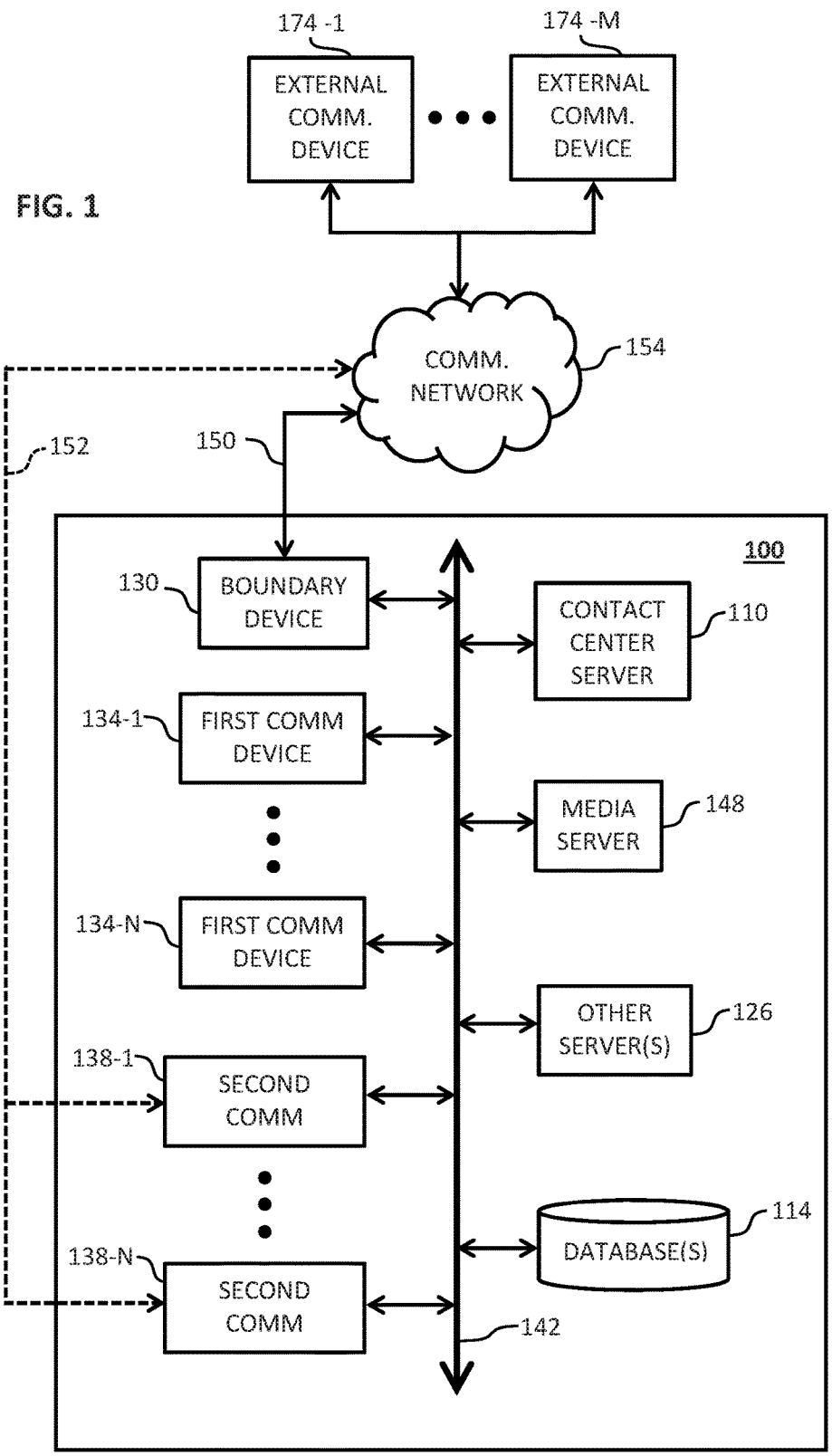
FIG. 1 illustrates a communications system architecture in accordance with the principles of the present disclosure.

The present disclosure will be illustrated below in conjunction with an exemplary communications system. Although well suited for use with, e.g., a system having an Automated Call or Contact Distribution (ACD) system or other similar contact processing switch, the present disclosure is not limited to any particular type of communications system switch or configuration of system elements. Those skilled in the art will recognize that the disclosed techniques may be used in any communications application in which it is desirable to provide improved contact processing.

In the following detailed description, numerous specific details are set forth in order to provide a thorough understanding of embodiments or other examples described herein. In some instances, well-known methods, procedures, components and circuits have not been described in detail, so as to not obscure the following description. Further, the examples disclosed are for illustrative purposes only and should not be construed as limiting of the scope of embodiments of the present disclosure.

The term "a" or "an" entity refers to one or more of that entity. As such, the terms "a" (or "an"), "one or more," and "at least one" may be used interchangeably herein. It is also to be noted that the terms "comprising," "including," and "having" may be used interchangeably.

The term "automatic" and variations thereof, as used herein, refers to any process or operation done without material human input when the process or operation is performed. However, a process or operation may be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participates in storing and/or providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, RAM, PROM, EPROM, FLASH-EPROM, solid state medium like a memory card, any other memory chip or cartridge, a carrier wave as described hereinafter, or any other medium from which a computer may read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

As used herein in connection with embodiments of the present disclosure, the term "contact" refers to a communications from a user or customer. The communications may be by way of any communications medium such as, but not limited to, a telephone call, e-mail, instant message, web chat, and the like. The terms "user" and "customer" denote a party external to the contact center and are used herein to refer to the other party to a contact or a communications session. A user or customer may include, for example, a person requesting assistance for himself or herself or a person requesting assistance for a third party and may also include, for example, a person having a commercial relationship with the contact center or with a business represented by the contact center.

For each "contact" received by the contact center, a computer of the contact center will instantiate a "contact object," which may comprise one or more variables, functions, and data structures that represent the contact. Each contact object comprises a number of attributes, which are assigned values based on its corresponding contact. Each contact object can also include pointers, links or references to other data and/or attributes associated with its corresponding contact. The contact object may be passed amongst the different queues, databases, systems, software applications and other computer-based resources of the contact center. Each contact object may also include a forward reference to another contact object and a backward reference to yet another contact object. In this manner, a prioritized list, or queue, of contact objects may be constructed.

The terms "determine," "calculate," and "compute," and variations thereof, as used herein, are used interchangeably and include any type of methodology, process, mathematical operation or technique.

As used herein, the term "gateway" may generally comprise any device that sends and receives data between devices. For example, a gateway may comprise routers, switches, bridges, firewalls, other network elements, and the like, and any combination thereof.

The term "module" as used herein refers to any known or later developed hardware, software, firmware, artificial intelligence, fuzzy logic, or combination of hardware and software that is capable of performing the functionality associated with that element. Also, while the present disclosure is described in terms of exemplary embodiments, it should be appreciated those individual aspects of the present disclosure may be separately claimed.

As used herein, the term "signal" may include one or more of an electrical signal, a radio signal, an optical signal, an acoustic signal, and so forth.

The terms "switch," "server," "contact center server," or "contact center computer server" as used herein should be understood to include a Private Branch Exchange (PBX), an ACD system, an enterprise switch, or other type of telecommunications system switch or server, as well as other types of processor-based communications control devices such as, but not limited to, media servers, computers, adjuncts, and the like.

Automatic Call or Contact Distribution (ACD) is a communications server software feature that processes incoming, outgoing, and internal calls and distributes them to groups of extensions called hunt groups or splits. The communications server also sends information about the operation of the ACD to a Call Management System (CMS) which stores and formats the data and produces real-time and historical reports on ACD activity. ACD is used by a contact center to route incoming calls to specifically assigned splits/skills and agents. ACD allows a system administrator to create an efficient call management environment.

One or more embodiments of the present disclosure may utilize Session Initiation Protocol (SIP) as a communications protocol. SIP is a communications protocol that is known and described in Internet Engineering Task Force (IETF) Request For Comment (RFC) 3261, the content of which is hereby incorporated by reference in its entirety. SIP is an open signaling protocol for establishing many kinds of real-time communications sessions. Examples of the types of communications sessions that may be established using SIP include voice, video, and/or instant messaging. SIP also facilitates peer-to-peer communications sessions. These communications sessions may be carried out on any type of communications device such as a personal computer, laptop computer, Personal Digital Assistant, telephone, mobile phone, cellular phone, or the like. One key feature of SIP is its ability to use an end-user's Address of Record (AOR) as a single unifying public address for all communications. Thus, in a world of SIP-enhanced communications, a user's AOR becomes their single address that links the user to all of the communications devices associated with the user. Using this AOR, a caller can reach any one of the user's communications devices, also referred to as User Agents (UAs) without having to know each of the unique device addresses or phone numbers.

Users or any other addressable entities in a SIP framework are identified by Universal Resource Identifiers (URI). Each such Internet-style address (for example, sip:johndoe@avaya.com) maps into one or more Contacts, each of which typically represents a device or service at which the corresponding user may be reached. Examples include phones, desktop multimedia clients, instant message accounts, email accounts and so on. The SIP framework is responsible for routing a request for a peer-to-peer session addressed to a given URL to one or more appropriate contacts for that URL. The SIP framework may utilize information about the preferences, presence, and location of the user identified by the URL to determine the most appropriate contacts. The protocol also provides mechanisms to specify the type of session that is requested, as well as means to change session parameters.

SIP is not a vertically integrated communications system. Rather, SIP is a component that may be used with other IETF protocols to build a complete multimedia architecture. Typically, these architectures will include protocols such as Real-Time Transport Protocol (RTP) (RFC 3550) for transporting real-time data and providing Quality of Service (QoS) feedback, the Real-Time Streaming Protocol (RTSP) (RFC 2326) for controlling delivery of streaming media, the Media Gateway Control Protocol (MEGACO) (RFC 3015) for controlling gateways to the Public Switched Telephone Network (PSTN), and the Session Description Protocol (SDP) (RFC 4566) for describing multimedia sessions. Therefore, SIP may be used in conjunction with other protocols in order to provide complete services to the users. However, the basic functionality and operation of SIP does not depend on any of these protocols.

The Real-Time Transport Control Protocol (RTCP) is a protocol that is known and described in IETC RFC 3550. RTCP provides out-of-band statistics and control information for an RTP media stream. It is associated with RTP in the delivery and packaging of a media stream but does not transport the media stream itself. Typically, the RTP media stream will be sent on an even-numbered user datagram protocol (UDP) port, with RTCP messages being sent over the next higher odd-numbered port. RTCP may be used to provide feedback on the QoS in media distribution by periodically sending statistics information to participants in a streaming multimedia session. Systems implementing RTCP gather statistics for a media connection and information such as transmitted octet and packet counts, lost packet counts, jitter, and round-trip delay time. An application program may use this information to control QoS parameters, for instance by limiting a flow rate or by using a different codec.

FIG. 1 shows an illustrative embodiment of a communications system comprising a contact center 100 according to the present disclosure. The contact center 100 is in communications with one or more external communications devices 174-1 to 174-M via a communications link 150 and a communications network 154, where M is an integer, M≥1. The external communications devices 174-1 to 174-M are associated with one or more contacts or customers and may comprise, for example, cellular phones, laptops, Personal Computers (PCs), Personal Digital Assistants (PDAs), digital phones, analog phones, and the like. The external communications devices 174-1 to 174-M may be configured to support one or more types of streaming media such as an audio media stream and/or a video media stream. The communications network 154 may be packet-switched and/or circuit-switched and may comprise, for example, a Wide Area Network (WAN) such as the Internet, a PSTN, a Plain Old Telephone Service (POTS) network, a cellular communications network, or combinations thereof. A packet-switched network may comprise any data and/or distributed processing network and typically includes proxies (not shown), registrars (not shown), and routers (not shown) for managing packet flows. A circuit-switched network may comprise a plurality of trunks (not separately labeled).

Figure 2:
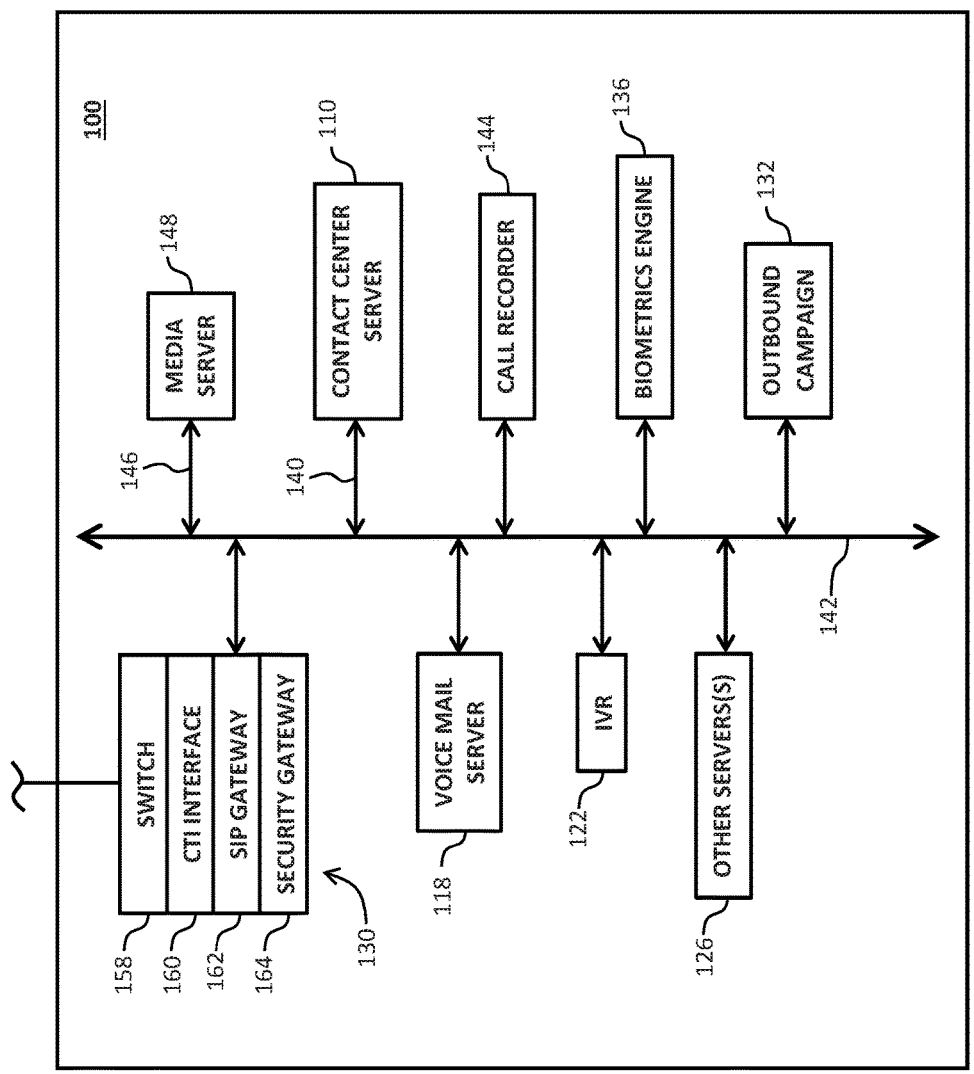
FIG. 2 illustrates aspects of a contact center in accordance with principles of the present disclosure.

As explained in more detail with respect to FIG. 2, the contact center 100 comprises a boundary device 130, a central contact center server 110, a media server 148, one or more other servers 126, and a set of data stores or databases 114 (see FIG. 1) within the contact center 100 containing contact- or customer-related information and other information that may enhance the value and efficiency of the contact processing. Some or all of the components of the contact center 100 may be interconnected by a network 142 such as a local area network (LAN) or WAN. Although one central contact center server 110 is depicted in FIG. 1, two or more servers 110 may be provided in a single contact center 100 or across multiple separate LANs 142 owned and operated by a single enterprise, but separated by the communications network 154. Likewise, two or more media servers 148 may be provided in the contact center 100. In configurations where the contact center 100 includes two or more servers 110 and/or media servers 148, each server 110, 148 may comprise similar functionality, but may be provisioned for providing its features to only a subset of all contact center users. In addition, it should be understood that some or all of the functions depicted in FIGS. 1-3 may be co-hosted and/or co-resident on a single server and/or processor.

The contact center 100 further comprises a plurality of working agents operating packet-switched (first) communications devices 134-1 to 134-N (such as computer workstations or personal computers) and/or circuit-switched (second) communications devices 138-1 to 138-N, where N is an integer, N≥1. The first agent communications devices 134-1 to 134-N may include, for example, IP hardphones such as the 4600 Series IP Phones™ by Avaya Inc., IP softphones such as the IP Softphone™ by Avaya Inc., Personal Digital Assistants (PDAs), Personal Computers (PCs), laptops, packet-based H.320 video phones and conferencing units, packet-based voice messaging and response units, packet-based traditional computer telephony adjuncts, peer-to-peer based communications devices, and any other suitable communications device. In one configuration, the server 110, the network 154, and the first agent communications devices 134-1 to 134-N are SIP compatible and may include interfaces for various other protocols such as the Lightweight Directory Access Protocol (LDAP), H.248, H.323, Simple Mail Transfer Protocol (SMTP), IMAP4, ISDN, E1/T1, and analog line or trunk. The second agent communications devices 138-1 to 138-N may each correspond to one of a set of internal extensions Ext1 to ExtN, respectively, and may include, for example, wired and wireless telephones, PDAs, H.320 videophones and conferencing units, voice messaging and response units, traditional computer telephony adjuncts, and any other suitable communications device. The second agent communications devices 138-1 to 138-N may be in communications with the external communications devices 174-1 to 174-M via one or more link(s) 152. The link(s) 152 is depicted with a dashed line to indicate that it represents a logical representation of the connections between the external communications devices 174-1 to 174-M and the second communications devices 138-1 to 138-N. The actual, physical connection between these devices can include various routing through the network 142, possibly the boundary device 130, and one or more of the servers 110, 148, 126.

It should be noted that the present disclosure does not require any particular type of information transport medium between the components of the contact center 100, i.e., the present disclosure may be implemented with any desired type of transport medium as well as combinations of different types of transport channels. It should also be emphasized that the configuration of the elements of the contact center 100 as shown in FIG. 1 is for purposes of illustration only and should not be construed as limiting the disclosure to any particular arrangement of elements.

FIG. 2 illustrates aspects of a contact center 100 in accordance with principles of the present disclosure comprising a boundary device 130, a contact center server 110, a media server 148, a call recorder 144, a biometrics engine 136, and an outbound campaign 132. The contact center 100 may also comprise a plurality of additional servers, namely a voice mail server 118, an Interactive Response unit (e.g., IVR) 122, and one or more other servers 126. Although depicted as separate servers and/or applications, it should be appreciated that some or all of the functions depicted in FIG. 2 may be co-hosted and/or co-resident on a single server and/or processor, e.g. the contact center server 110.

The contact center server 110 and the media server 148 may each be connected to the LAN 142 via its own respective communications link 140, 146, as shown, or via the switch 158 (not shown). The contact center server 110 may also be connected via one or more optional communications links (not shown) to one or more other components of the contact center 100, including for example, the media server 148, the call recorder 144, the biometrics engine 136, and the outbound campaign 132. As will be appreciated, the one or more other servers 126 may also include a scanner (which is normally not connected to the switch 130), VoIP software, video call software, voice messaging software, an IP voice server, a fax server, a web server, an e-mail server, and the like.

The boundary device 130 may include the functionality of one or more of a switch 158, a computer-telephony integration (CTI) interface 160, a SIP gateway 162, or a security gateway 164. The switch 158 and/or server 110 may comprise any architecture for directing contacts to the one or more agent communications devices 134, 138 (see FIG. 1). In some embodiments, the switch 158 may perform load-balancing functions by allocating incoming or outgoing contacts among a plurality of logically and/or geographically distinct contact centers 100. Illustratively, the switch 158 and/or server 110 may be a modified form of the subscriber-premises equipment sold by Avaya Inc. under the names Definity™ PBX-based ACD system, MultiVantage™ PBX, Communication Manager™, S8300™ media server and any other media servers, SIP Enabled Services™, Intelligent Presence Server™, and/or Avaya Interaction Center™, and any other products or solutions offered by Avaya or another company. Typically, the switch 158 and/or server 110 is a stored-program-controlled system that conventionally includes interfaces to external communications links, a communications switching fabric, service circuits (e.g., tone generators, announcement circuits, etc.), memory for storing control programs and data, and a processor (i.e., a computer) for executing the stored control programs to control the interfaces and the fabric and to provide automatic contact-distribution functionality. Other types of known switches and servers are well known in the art and therefore not described in detail herein.

As shown in FIGS. 1 and 2, the CTI interface 160 and SIP gateway 162 may facilitate communications between the external communications devices 174-1 to 174-M and the first and second agent communications devices 134, 138. The SIP gateway 162, for example, can connect with one or more SIP trunks from the communications network 154 and split incoming aggregate SIP traffic into individual SIP sessions and aggregate the individual outbound SIP sessions. The security gateway 164 may be positioned between the server 110 and the communications network 154 to process information passing between the server 110 and the communications network 154. The security gateway 164 may be, for example, Avaya Inc.'s, G700 Media Gateway™ and may be implemented as hardware such as via an adjunct processor (as shown) or as a chip in the server 110.

Although some embodiments are discussed with reference to a client-server architecture, it is to be understood that the principles of the present disclosure apply to other network architectures. For example, the present disclosure applies to peer-to-peer networks, such as those envisioned by SIP. In the client-server model or paradigm, network services and the programs used by end users to access the services are described. The client side provides a user with an interface for requesting services from the network, and the server side is responsible for accepting user requests for services and providing the services transparent to the user. By contrast, in the peer-to-peer model or paradigm, each networked host runs both the client and server parts of an application program. Additionally, the disclosure does not require the presence of packet- or circuit-switched networks.

Figure 3:
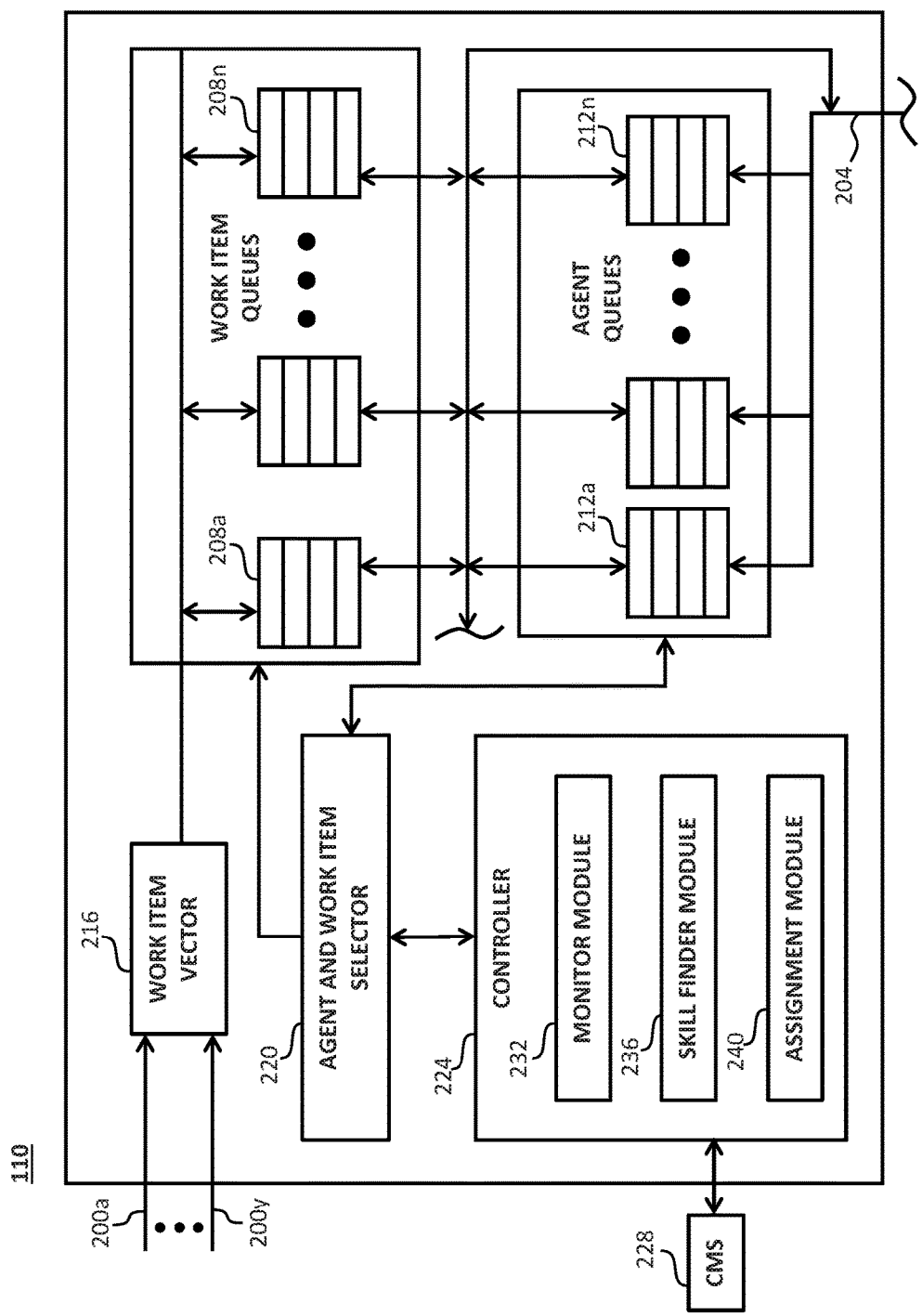
FIG. 3 illustrates a contact center server in accordance with principles of the present disclosure.

Referring to FIG. 3, one possible configuration of the central server 110 of a contact center 100 is depicted. The server 110 is in communications with a plurality of customer communications lines 200a-y (which may be one or more trunks, phone lines, etc.) and an agent communications line 204 (which may be a voice-and-data transmission line such as LAN 142 and/or a circuit switched voice line). The server 110 may include Avaya Inc.'s Operational Analyst™ (OA) with On-Line Analytical Processing (OLAP) technology or a Call Management System (CMS) 228 that gathers contact records and contact-center statistics for use in generating contact-center reports. The OA and the CMS will hereinafter be referred to jointly as CMS 228.

As may be seen in FIG. 3, included among the data stored in the server 110 is a set of work item queues 208a-n and a separate set of agent queues 212a-n. Each work item queue 208a-n corresponds to a different set of agent skills, as does each agent queue 212a-n. Conventionally, work items are prioritized and are either enqueued in individual ones of the work item queues 208a-n in their order of priority or in different ones of a plurality of work item queues 208a-n that correspond to a different priority. Likewise, each agent's skills are prioritized according to his or her level of expertise in that skill, and agents are either enqueued in individual ones of agent queues 212a-n in their order of expertise level or in different ones of a plurality of agent queues 212a-n that correspond to a skill and each one of which corresponds to a different expertise level.

Included among the control programs in the server 110 is a work item vector 216. Contacts incoming to the contact center are assigned by the work item vector 216 to different work item queues 208a-n based on a number of predetermined criteria, including customer identity, customer needs, contact center needs, current contact center queue lengths, customer value, and the agent skill that is required for the proper handling of the contact. Agents who are available for handling work items are assigned to agent queues 212a-n based on the skills that they possess. An agent may have multiple skills, and hence may be assigned to multiple agent queues 212a-n simultaneously. Furthermore, an agent may have different levels of skill expertise (e.g., skill levels 1-N in one configuration or merely primary skill levels and secondary skill levels in another configuration), and hence may be assigned to different agent queues 212a-n at different expertise levels.

In one configuration, the contact center may be operated by a contract operator, and each of the work item queues 208a-n, and possibly each of the agent queues 212a-n, corresponds to a different client. Each client may have a separate service level agreement or other type of performance measurement agreement with the contract operator regarding performance expectations, goals, requirements or specifications for the client's respective queue(s). The service level agreement may set forth penalties, such as financial penalties, for failing to comply with the service level agreement's requirements.

The contact center server 110 may be notified via the LAN 142 of an incoming work item by the communications component (e.g., the switch 130, fax server, e-mail server, web server, and/or other server) receiving the incoming work item. The incoming work item is held by the receiving telecommunications component until the server 110 forwards instructions to the component to forward or route the contact to a specific contact center resource, such as the IVR 122, one or more of the other servers such as a voice mail server 118, and/or a first or second agent communications device 134, 138 associated with a selected agent.

The server 110 distributes and connects these work items to first or second agent communications devices 134, 138 of available agents based on the predetermined criteria noted above. When the server 110 forwards a voice contact (or first work item) to an agent, the server 110 also forwards customer-related information from the database(s) 114 to the agent's computer work station for viewing (such as by a pop-up display) to permit the agent to better serve the customer. Depending on the contact center configuration, the server 110 may forward a list of work items to an available agent to preview before forwarding the work item itself and the data associated therewith to the agent. The agents process the work items or contacts sent to them by the server 110. This embodiment is particularly suited for a Customer Relationship Management (CRM) environment in which customers are permitted to use any media to contact a business. In a CRM environment, both real-time and non-real-time contacts must be handled and distributed with equal efficiency and effectiveness.

According to an embodiment of the present disclosure, also included among the programs executing on the server 110 are an agent and work item selector 220 and a controller 224, as shown in FIG. 3. The selector 220 and the controller 224 are stored either in the main memory or in a peripheral memory (e.g., disk, CD ROM, etc.) or some other computer-readable medium of the contact center 100. The selector 220 and the controller 224 collectively effect an assignment between available work items (or contacts) and available agents in a way that tends to maximize contact center efficiency for the current contact center state. The selector 220 uses predefined criteria in selecting an appropriate agent to service the work item. The controller 224 assists the work item vector 216 in routing the contacts to the appropriate work item queue(s) 208a-n and the selector 220 in routing a contact to a most desirable agent in the agent queue(s) 212a-n. The controller 224, in particular, obtains, for each of a plurality of contact center goals or objectives, status information, or information respecting whether or not a corresponding goal (for example, the service level agreement) is being met or unmet and/or a level to which the corresponding goal is being met or unmet.

Agent and customer profiles are typically maintained and updated by a profile generator (not shown). Upon the completion of handling a work item, the generator may collect selected metrics for the work item. These metrics include the skill involved in servicing the work item, the identifier of the servicing agent, the contact duration, the transaction or contact type (e.g., catalog sale, information request, complaint, etc.), the time-of-day, the result (e.g., the type of sale, the number of units sold, revenue generated, service ticket closure or escalation, the information provided, etc.), a self-rating of the servicing agent respecting the agent's proficiency in handling the work item, the rating of the customer of the agent's proficiency in handling the work item, the rating of another party, such as the agent's supervisor or another observer, of how the work item was serviced, whether the agent requested assistance, and whether the agent's training was completed, and stores the information in the database(s) 114, such as CMS 228. The metrics over a selected period of time are typically stored under each agent's profile and may include metrics associated with a plurality of work items serviced by the agent for each agent skill. Each agent's profile may also contain his or her skills and/or level(s) of skill expertise. Each customer profile includes metrics associated with a plurality of contacts by the customer.

The controller 224 has access to various performance measures of each of the agent resources and the contact handling history of the resources in the system. The controller 224 is also configured to use various systems, known in the art, to assess the performance of individual agent resources in processing work items. The controller 224 is further configured to find an area of competency for each of the agent resources based on their performance measures and contact handling history. The controller 224 is further configured to utilize such findings in maximizing contact center efficiency.

With reference to FIGS. 1 and 2, the call recorder 144 detects, via the CTI interface 160 and the SIP gateway 162, establishment of a communications session between the contact center 100 and a contact who is using one or more external communications devices 174. In one embodiment, the contact may communicate with a human agent who is using one or more agent communications devices 134, 138 and is assigned to the contact as described herein. In another embodiment, the contact may be communicating, in whole or in part, with an IVR system, e.g. IVR 122. The call recorder 144 may be implemented as one or more applications executing on a server, e.g. the contact center server 110. The call recorder 144 may instruct the switch 158 to create a three-party conference on the media server 148 comprising the external communications device(s) 174, the agent communications device(s) 134, 138, and the call recorder 144.

Streaming media in the form of an RTP media stream (not separately labeled) flows in both directions between the external communications device(s) 174 and the contact center 100. The call recorder 144 receives and records the RTP media stream and converts it into a format that is suitable for storage. The RTP media stream may comprise an incoming audio and/or video stream from the contact to the contact center 100, an outgoing audio and/or video stream from the contact center 100 to the contact, or both. In one embodiment, the call recorder 144 receives the incoming and outgoing RTP media streams as separate media streams. The call recorder 144 may then either store the two media streams separately or combine the two media streams for storage. In another embodiment, the media server 148 mixes the incoming and outgoing RTP media streams and transmits the mixed media stream to the call recorder 144.

To detect a potentially fraudulent contact, the biometrics engine 136 accesses the incoming RTP media stream in order to capture biometric data related to the contact and perform real-time biometrics analysis related to identifying and authenticating the contact. As used herein, the term "real time" and derivatives thereof refer to analysis and actions performed during a single, active communications session, i.e. during the timeframe between establishment and termination of the communications session, and preferably within a very short time, e.g. within 20 seconds, of capturing or extracting the biometric data. Biometric data collection and analysis provides a convenient, non-invasive, and accurate way to verify a contact's identity and quickly determine whether the contact is authorized to access the requested information and services. Biometric analysis typically involves authenticating a contact based on stored or historical biometric data, which may be obtained during one or more communications sessions with the customer and/or from one or more third parties. Biometric data associated with a customer may be stored, for example, in the database(s) 114, along with other contact- or customer-related information.

The biometrics engine 136 may be implemented as one or more applications executing on a server, e.g. the contact center server 110. In one embodiment, the biometrics engine 136 is in communications with the call recorder 144 and accesses the incoming RTP media stream via the call recorder 144. In other embodiments, the biometrics engine 136 may directly receive the incoming RTP media stream. The biometrics engine 136 captures one or more types of biometric data from the incoming audio and/or video stream associated with the contact and compares the captured biometric data with the historical biometric data to determine a likelihood of fraud, i.e. a likelihood that the contact is a fraudster or other unauthorized person.

The biometric engine 136 may conduct the comparison using one or more known algorithms, such as those embodied in various fraud detection and prevention products offered by, for example, Nice® Systems Ltd., Nuance® Communications, Inc., and Verint® Systems, Inc., to determine a degree of similarity and/or a confidence interval. For example, the biometrics engine 136 may employ one or more known facial recognition algorithms that extract a customer's facial features from an image captured during the communications session and perform a comparison between the extracted facial features and historical biometric data. Alternatively, or in addition to facial recognition, the biometrics engine 136 may utilize one or more known voice recognition algorithms to extract unique characteristics of a customer's voice and compare these extracted characteristics to one or more stored voice prints for that customer. In other embodiments, the biometrics engine 136 may use one or more additional algorithms that identify and compare other physical characteristics and/or behavioral patterns that uniquely identify a person such as retinal scans, vein patterns, hand movement patterns, and the like.

Where a degree of similarity or a confidence level calculated by the biometrics engine 136 exceeds a predetermined threshold, e.g., a degree of similarity greater than or equal to 90%, the contact may be deemed to be authentic. If the degree of similarity is below this threshold, the contact may be identified as potentially fraudulent, and the contact may be flagged for further action. The above example predetermined threshold of 90% may vary based on aspects of the communications session. For example, when the contact is attempting to make a significant withdrawal from a financial account during the communications session, the predetermined threshold value may be higher than when the contact is making an account-balance inquiry during the communications session. Similarly, if an economic value can be assigned to a transaction being attempted during the communications session, then this predetermined threshold value may vary based on the assigned economic value.

In general, audio and/or video data associated with all incoming contacts in a contact center 100 are recorded for quality improvement, e.g. quality monitoring of agent performance, and the like. However, the quality of these routine recordings may be too low to provide the biometrics engine 136 with sufficient data to definitively identify the contact as genuine, during or after the communications session. In accordance with the present disclosure, the contact center 100 may adjust one or more parameters related to the incoming audio and/or data stream in real time, e.g. during the present communications session in which the potential risk of fraud is detected. As a result, the quality of the incoming RTP media stream is enhanced such that the contact center 100 is able to recognize the contact as authentic, identify potential fraudsters, etc.

For example, the biometrics engine 136 may request a change to one or more characteristics related to an audio and/or video quality of the incoming RTP media stream associated with the potentially fraudulent contact. The request may be transmitted from the biometrics engine 136 to the call recorder 144 and optionally to the external communications device 174 via the boundary device 130. In one embodiment, the biometrics engine 136 may request a real-time change to a codec used to encode or decode the incoming RTP media stream for transmission, storage, and the like. Audio and video data may be encoded and decoded using a variety of codecs, and each codec is generally selected based on the requirements and limitations of the respective network, e.g. available bandwidth, required sound quality, etc. The requested change to the audio and/or video codec may involve, for example, switching from a lossy codec to a lossless codec. Lossy codecs may be used during normal operation and may involve compression to decrease the size of the data file for storage. Lossless codecs may involve compression without information loss or no compression at all, such that the change to a lossless codec may, for example, increase the fidelity of an incoming audio stream and increase the resolution of an incoming video stream. Because data may be re-encoded one or more times during transmission between networks, e.g. between a cellular network and a VoIP network, the requested change to the codec may involve a change to a codec used by the contact center 100 (e.g., the call recorder 144), the external communications device 174, or both.

In another embodiment, the incoming audio and/or video stream may comprise a pulse code modulated (PCM) stream, and altering the characteristic(s) related to the audio and/or video quality of the incoming media stream comprises increasing a sampling rate and/or a bit-depth.

In some embodiments, the biometrics engine 136 may request a change to one or more settings of a camera associated with the external communications device 174, such as adjusting a camera angle, zooming in or out, adjusting an amount of light that is allowed to enter the camera, etc.

In a further embodiment, the biometrics engine 136 may ensure that the incoming and outgoing RTP media streams are transmitted separately to, and recorded separately by, the call recorder 144. In configurations in which the media server 148 mixes the incoming and outgoing media streams before transmission to the call recorder 144, the biometrics engine 136 may transmit instructions to the media server 148 to begin transmitting the incoming and outgoing media streams separately to the call recorder 144 upon detection of a potentially fraudulent contact. In other configurations in which the call recorder 144 mixes the incoming and outgoing media streams prior to storage, the biometrics engine 136 may instruct the call recorder 144 to store the two media streams separately. The separate transmission and storage of the incoming and outgoing streams may be performed independently of, or in conjunction with, the other enhanced recording techniques described herein.

In all embodiments, the one or more characteristics of the incoming RTP media stream are altered without modifying any characteristics associated with the audio and/or video quality of the outgoing RTP media stream from the contact center 100 to the contact. Thus, the potential fraudster is unaware that a security process has been triggered, and the contact center 100 may continue collecting additional data without alerting the potential fraudster.

The call recorder 144 continues to receive the incoming RTP media stream with the one or more altered characteristics for at least a portion of the duration of the communications session. The biometrics engine 136 may perform additional, real-time biometric analysis using one or more biometric analysis methods, as described herein, on audio and/or video data from the altered incoming RTP media stream associated with the potentially fraudulent contact. The biometrics engine 136 may request additional or further real-time alterations of one or more characteristics related to the quality of the altered incoming RTP media stream as described herein.

The altered incoming RTP media stream may also be stored for further analysis at a later time. For example, additional biometric analysis of the higher quality audio and/or video data may indicate that the contact is genuine and that the system had registered a false positive. In that case, the data from the altered incoming RTP media stream may be added to the historical biometric data for use in accurately identifying the customer during a future communications session, thereby eliminating any inconvenience to the customer. Where the additional biometric analysis still indicates that a contact is fraudulent, the data from the altered incoming RTP media stream may be used to add the fraudster to a blacklist and/or to flag the contact for further analysis or additional investigation. The higher quality audio and/or video data may also be used to obtain an accurate recording of the fraudster's environment, e.g. background noise, setting, etc., and to determine the network(s) used by the fraudster, all of which may be stored with the biometric data to permit faster identification of fraudulent activity.

In some embodiments, the biometrics engine 136 may send a request to an outbound campaign 132, which automatically schedules and initiates one or more subsequent communications sessions with a user device, e.g. an external communications device 174, associated with the contact. The contact center 100 then receives a subsequent incoming RTP media stream during each subsequent communications session. Each subsequent incoming RTP media stream may comprise an audio stream, a video stream, or both. The subsequent communications session(s) may be scheduled and initiated where an identified security risk is low enough that immediate refusal of services or access to information may not be warranted but requires further action to eliminate or further reduce the risk. For example, the degree of similarity between the captured biometric data and the historical biometric data may be below the threshold of 90% but above 80%, indicating a high degree of similarity, e.g. in situations in which a customer has a temporary change to his or her physical appearance or voice. Thus, one or more subsequent communications sessions may be initiated with the customer to further verify his or her identity and/or to confirm that the customer recently contacted the contact center 100.

The low security risk may also result from biometric analysis results that are inconclusive due to incomplete or limited historical biometric data and/or that indicate potential confusion as to the customer's identity, e.g. similarity with the historical biometric data of one or more other customers of the contact center 100. The subsequent communications session(s) may be initiated with the customer in order to obtain additional biometric data and remove any confusion as to the customer's identity. If needed, one or more communications sessions may also be initiated with the one or more other customers to verify their identity and clear up any confusion.

The low security risk may further include situations in which biometric analysis indicates that the contact is likely genuine but the communications session involves certain higher risk transactions, such as when a customer wishes to transfer a sum of money in excess of a certain amount or requests to add a new authorized user to an account. One or more subsequent communications sessions may be routinely scheduled following a communications session involving these types of higher risk transactions.

For example, following conclusion of the present communications session, the outbound campaign 132 may automatically schedule and initiate a subsequent outbound phone call to a phone number provided by the contact during the previous communications session. Alternatively, or in addition to this phone call, the outbound campaign 132 may automatically schedule and initiate an outbound phone call to another phone number with which the contact has previously been identified, e.g. a phone number provided during the customer's initial contact with the contact center 100. In one embodiment, the customer is not aware of the intent of the subsequent communications session. For example, the subsequent phone call may be characterized as a follow-up survey or as a marketing call. In another embodiment, both the customer and the agent handling the outbound call are unaware of the intent of the call. In a further embodiment, a subsequent communications session may be initiated during the present communications session.

One or more of the subsequent communications sessions may employ the enhanced recording techniques described herein to alter one or more characteristics related to a quality of the subsequent incoming audio and/or video stream(s). Alteration of the one or more characteristics of the subsequent incoming RTP media stream is performed without altering any characteristics related to the audio and/or video quality of an outgoing RTP media stream from the contact center 100 to the user device. In some cases, more than one subsequent communications session may be needed to obtain enough biometric data to reliably identify the customer in the future and to eliminate or further reduce the risk of fraud. Where subsequent communications sessions still do not eliminate the contact as fraudulent, the biometrics engine 136 may add the fraudster to a blacklist and/or flag the contact for further analysis or action as described herein. In some embodiments, the previous communications session may have involved audio only, and the subsequent communications session(s) may include audio and video in order to obtain additional biometric data or different types of biometric data.

Figure 4:
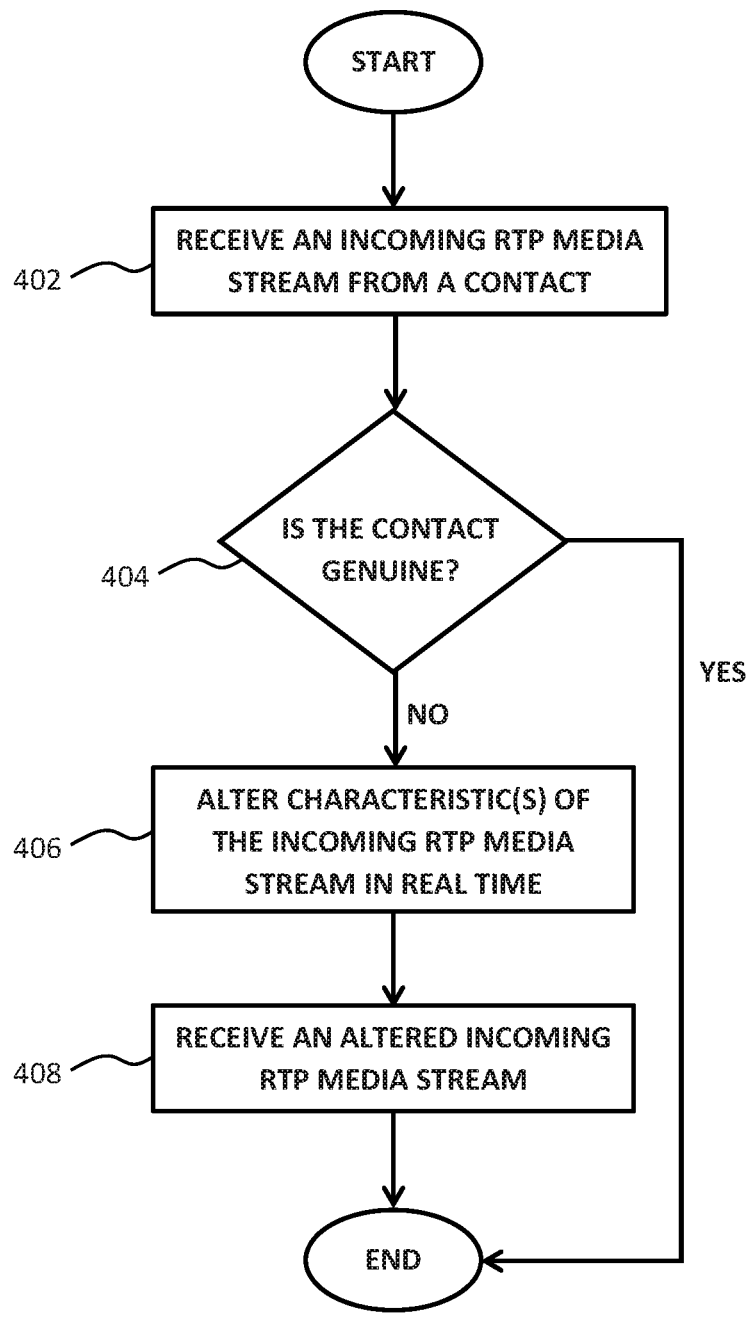
FIGS. 4 and 5 are flowcharts of exemplary methods for detecting and reducing fraud in accordance with the present disclosure.
Figure 5:
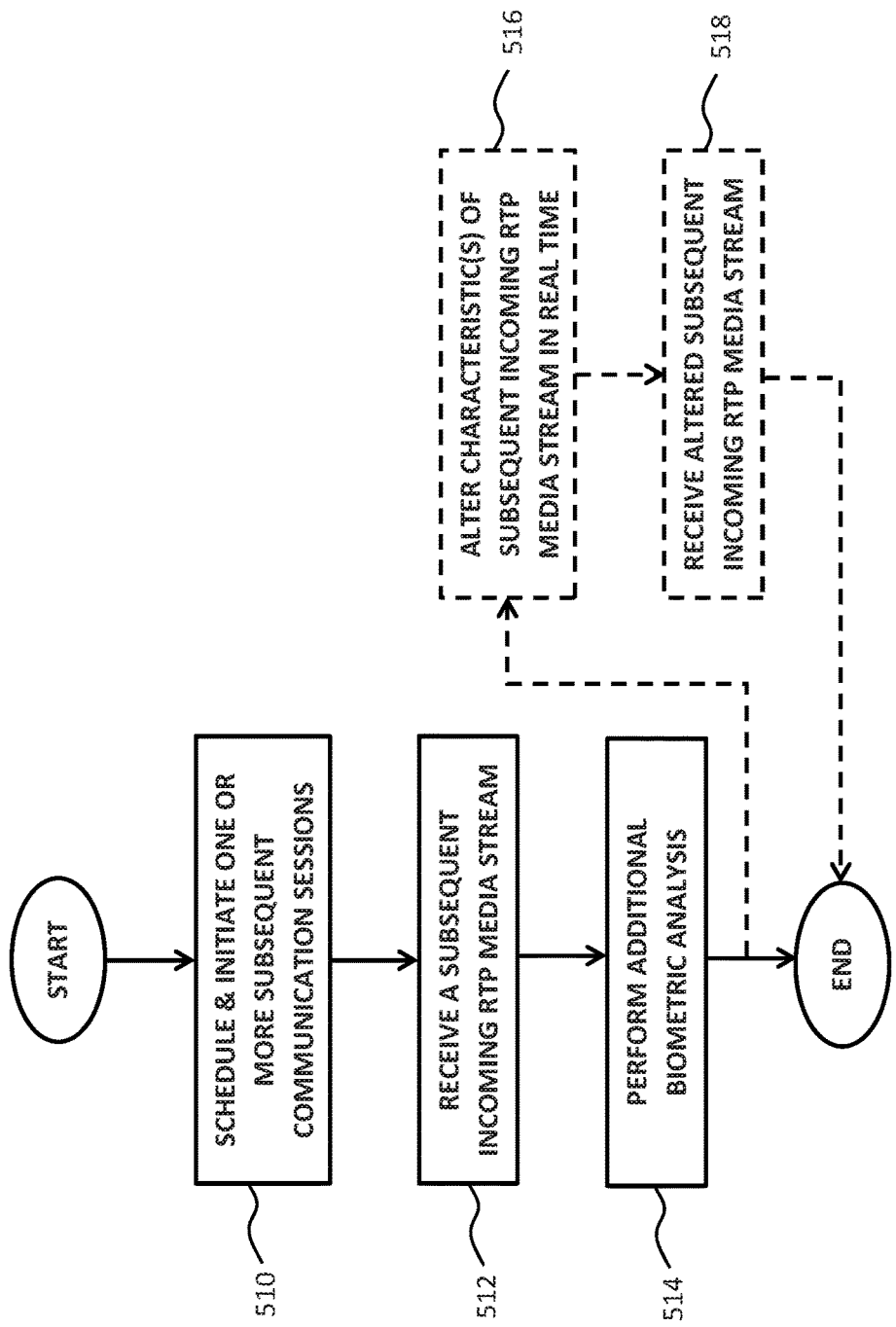

FIGS. 4 and 5 illustrate exemplary methods for detecting and reducing fraud in accordance with the present disclosure. These methods may be performed all or in part by a server of a contact center 100, e.g. central server 110, executing instructions stored in one or more memory devices.

FIG. 4 is a flowchart illustrating an exemplary method for detecting fraud in accordance with the present disclosure. The method begins at Step 402 when a new contact is established in the contact center 100 and an incoming RTP media stream associated with the contact is received. The incoming RTP media stream may comprise an audio stream, a video stream, or both and may be received, for example, by the call recorder 144 and/or the biometrics engine 136 in the contact center 100. At Step 404, the incoming RTP media stream is subjected to analysis using one or more real-time biometric analysis methods, as described herein, to determine whether the contact is genuine. If it is determined that the contact is likely genuine ("Yes"), the communications session may proceed without altering any characteristics of the incoming RTP media stream and the method terminates.

If it is determined that the contact is likely not genuine and is thus potentially fraudulent as described herein ("No"), the method proceeds to Step 406 in which one or more characteristics related to an audio quality and/or a video quality of the incoming RTP media stream associated with the potentially fraudulent contact are altered in real time, as described herein. In one embodiment, altering the one or more characteristics of the incoming RTP media stream comprises requesting a change in a codec type. In another embodiment, the incoming media stream comprises a PCM stream, and altering the one or more characteristics related to the audio and/or video quality of the incoming media stream comprises increasing a sampling rate and/or a bit-depth. In a further embodiment, altering the one or more characteristics of the incoming media stream comprises requesting a change to a setting of a camera of a user device, e.g. an external communications device 174, associated with the potential fraudulent contact. In all embodiments, alteration of the one or more characteristics of the incoming RTP media stream is performed without altering any characteristics related to the audio and/or video quality of the outgoing RTP media stream from the contact center 100 to the potential fraudulent contact, such that the potential fraudulent contact is not alerted to the change(s) in the audio and or video qualities of the incoming RTP media stream. At step 408, the contact center 100 receives the altered incoming RTP media stream, after which the method concludes.

FIG. 5 is a flowchart illustrating an exemplary method for detecting and reducing fraud in accordance with the present disclosure. At Step 510, one or more subsequent communications sessions with a user device 174 associated with the contact are scheduled and initiated by the contact center 100, e.g. by the outbound campaign 132, based on a security risk associated with the contact. For example, the outbound campaign 132 may schedule a phone call to a phone number provided by the customer during the immediately previous communications session and/or to another phone number associated with the customer. At Step 512, the contact center 100 receives a subsequent incoming RTP media stream during each subsequent communications session. Each subsequent incoming RTP media stream may comprise an audio stream and/or a video stream from the user device 174 to the contact center 100. The one or more subsequent communications sessions may be scheduled and initiated based on identification of a low risk of fraud. For example, as described herein, the degree of similarity between the captured biometric data and the historical biometric data may be just below the level required for authentication, and/or the historical biometric data associated with the customer may be incomplete or inadequate. In addition, the customer may be requesting a higher risk transaction that warrants additional security measures to ensure that the customer is genuine.

In one embodiment, additional biometric analysis is performed at Step 514 during the one or more subsequent communications sessions using one or more biometric analysis methods as discussed herein, after which the method may conclude. In another embodiment, at Step 516, one or more characteristics related an audio quality and/or a video quality of the subsequent incoming RTP media stream may be altered in real time, as described herein. Alteration of the one or more characteristics of the subsequent incoming RTP media stream is performed without altering any characteristics related to the audio and/or video quality of the outgoing RTP media stream from the contact center 100 to the user device 174, such that the contact is not alerted to the change(s) in the audio and or video qualities of the incoming RTP media stream. At step 518, the contact center 100 receives the altered subsequent incoming RTP media stream, after which the method concludes.

The presently disclosed system and method may be more fully understood by way of the following examples.

Example 1: A Newer Customer

The contact center 100 receives a phone call from a newer customer. The only other biometric data available for this customer was collected during an initial phone call during which the customer signed up for a service administered by the contact center 100. Thus, the biometric data available for identifying and authenticating the customer is relatively limited. The biometrics engine 136 requests a change to a characteristic related to an audio quality of the incoming RTP media stream associated with the customer. For example, the biometrics engine 136 may request a change from a lossy audio codec, which is used in day-to-day operation with more established customers, to a lossless audio codec, which increases the fidelity of the incoming audio stream. Biometric data, such as characteristics of the customer's voice, is extracted from the higher quality incoming audio stream and is compared in real time to the existing biometric data to authenticate the customer. The new biometric data is also added to the stored biometric data for use in accurately identifying and authenticating the customer during future communication sessions.

The changes to the incoming audio stream are accomplished without altering the outgoing audio stream from the contact center 100 to the customer. Thus, while the customer is aware that the conversation is being recorded, the customer does not perceive the change to the incoming audio stream. In this Example, fraud is not suspected, but by altering characteristics only of the incoming audio stream, the contact center 100 achieves its goal of obtaining more biometric data of better quality without inconveniencing the customer or making the customer self-conscious.

Example 2: A Customer Requesting a High-Risk Transaction

The contact center 100 receives a phone call from a customer who identifies himself as a financial account holder and requests a transfer of $10,000 from his account to another account. Due to the significant risk of loss if the transaction is fraudulent, this request is classified as "high risk" by the contact center 100 and triggers a higher threshold for biometric authentication. For example, the transaction may be refused if biometric analysis of the customer's voice indicates a degree of similarity less than 95%. This higher threshold for biometric authentication may be invoked for all high-risk transactions, even those involving established customers with significant amounts of stored biometric data.

The biometrics engine 136 requests a change to the quality of the incoming audio stream, e.g. a codec change, in order to obtain higher quality biometric data for analysis and authentication. The biometrics engine 136 then extracts biometric data from the higher quality incoming audio stream and compares it in real time to stored voice print data associated with the account holder. If the comparison indicates, for example, a degree of similarity of 98%, the biometrics engine 136 determines that the customer is likely authentic and the transaction is allowed to proceed. However, if the comparison indicates a degree of similarity of only 45%, the biometrics engine 136 identifies the caller as potentially fraudulent and the transaction is denied. Because the characteristics of the incoming audio stream have been altered without alerting the potential fraudster, the contact center 100 may continue recording the higher quality incoming audio stream, which may be used, for example, to add the person to a blacklist of suspected fraudsters.

Example 3: A Customer with a Change to a Physical Characteristic

In this Example, the contact center 100 receives a phone call from a customer who currently has a sore throat. She is an established customer with a large amount of stored biometric data, but as a result of the temporary changes to her voice, the biometrics engine 136 is unable to authenticate the customer using the normal recording parameters for the contact center 100. For example, the required degree of similarity between the stored and captured biometric data for successful authentication may be 90%, and the initial biometric analysis of the audio data from this customer indicates a degree of similarity of 85%, which falls short of the required threshold but still indicates a high degree of similarity. The biometrics engine 136 then requests a change to the quality of the incoming audio stream, e.g. a codec change, in order to obtain higher quality biometric data for analysis and authentication. Using this higher quality recording, the biometrics engine 136 may then be able to authenticate the customer despite differences in her voice.

This Example may also apply to video calls involving a customer with a change to his or her physical appearance, e.g. a bandage, the presence or absence of facial hair, etc., that prevents the biometrics engine 136 from authenticating the customer using, for example, facial recognition. In this case, the biometrics engine 136 may request a change to the video codec to increase the resolution of an incoming video stream and/or a change to the audio codec to increase the fidelity of the incoming audio stream. The biometrics engine 136 may then use the higher quality video and/or audio data to authenticate the customer using facial recognition and/or voice print comparisons.

Example 4: The Contact Center Initiates a Callback

The contact center 100 may schedule and initiate one or more subsequent outbound communications sessions with a customer. The biometrics engine 136 sends a request to an outbound campaign 132, which automatically schedules and initiates one or more subsequent communications sessions with one or more user devices associated with the customer. The subsequent communications session(s) may utilize one or more of the enhanced recording techniques described herein to alter one or more characteristics related to a quality of the subsequent incoming audio and/or video stream(s). In some cases, the previous call initiated by the customer may have been audio only, and the follow-up communications session may include audio and video in order to obtain additional or new types of biometric data for the customer.

The subsequent communications session(s) may be initiated for a variety of reasons, even in cases where fraud is not suspected. In Example 1, the existing biometric data for the newer customer is limited, and the contact center 100 initiates one or more follow-up calls in order to obtain additional biometric data for use in authenticating the customer in the future. In Example 2, a follow-up call may be initiated to determine whether the account holder actually made the transfer request and/or to verify a phone number provided during the previous phone call. Where the customer has a change to a physical characteristic as in Example 3, the subsequent communications session(s) may be used to verify the customer's identity following removal of a temporary physical change or to obtain additional biometric data for a customer with a permanent physical change. In some cases, the agent communicating with the customer may be aware of the reason for the subsequent call(s), i.e. fraud is suspected, but in other cases, neither party is aware of the reason for the follow-up call.

The flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). In addition, while the flowcharts have been discussed and illustrated in relation to a particular sequence of events, it should be appreciated that changes, additions, and omissions to this sequence may occur without materially affecting the operation of the disclosure. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, microcode, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that may contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that may communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as JAVA, SCALA, SMALLTALK, EIFFEL, JADE, EMERALD, C++, CII, VB.NET, PYTHON or the like, conventional procedural programming languages, such as the "c" programming language, VISUAL BASIC, FORTRAN 2003, PERL, COBOL 2002, PHP, ABAP, dynamic programming languages such as PYTHON, RUBY, and GROOVY, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks. Alternatively, a symmetric multiprocessor (SMP) system or other configuration including a plurality of processors may be used.

These computer program instructions may also be stored in a computer readable medium that when executed may direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions that execute on the computer or other programmable apparatus provide processes for implementing the functions/acts specified in the flowchart and/or block diagram block or blocks.

While the exemplary embodiments illustrated herein show the various components of the system collocated, certain components of the system may be located remotely, at distant portions of a distributed network, such as a LAN and/or the Internet, or within a dedicated system. Thus, it should be appreciated, that the components of the system may be combined in to one or more devices, such as a switch, server, and/or adjunct, or collocated on a particular node of a distributed network, such as an analog and/or digital telecommunications network, a packet-switch network, or a circuit-switched network. It will be appreciated from the preceding description, and for reasons of computational efficiency, that the components of the system may be arranged at any location within a distributed network of components without affecting the operation of the system. For example, the various components may be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements may be wired or wireless links, or any combination thereof, or any other known or later developed element(s) that is capable of supplying and/or communicating data to and from the connected elements. These wired or wireless links may also be secure links and may be capable of communicating encrypted information. Transmission media used as links, for example, may be any suitable carrier for electrical signals, including coaxial cables, copper wire, and fiber optics, and may take the form of acoustic or light waves, such as those generated during radio-wave and infra-red data communications.

A number of variations and modifications of the disclosure may be used. It would be possible to provide for some features of the disclosure without providing others. For example, in one alternative embodiment, the systems and methods of this disclosure may be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein may be used to implement the various aspects of this disclosure. Exemplary hardware that may be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing may also be constructed to implement the methods described herein.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

While the foregoing is directed to embodiments of the present disclosure, other and further embodiments of the present disclosure may be devised without departing from the basic scope thereof. It is understood that various embodiments described herein may be utilized in combination with any other embodiment described, without departing from the scope contained herein. Further, the foregoing description is not intended to be exhaustive or to limit the present disclosure to the precise form disclosed. Modifications and variations are possible in light of the above teachings or may be acquired from practice of the present disclosure.

What is claimed is:

1. A method for detecting fraud in a contact center, the method comprising:
    receiving, by a processor of the contact center, an incoming Real-Time Transport Protocol (RTP) media stream associated with a contact, wherein the incoming RTP media stream comprises at least one of an audio stream or a video stream;
    determining, by the processor of the contact center, based on a real-time biometric analysis of the incoming RTP media stream, that the contact is a potential fraudulent contact;
    altering, by the processor of the contact center in real time, at least one characteristic related to one or more of an audio quality or a video quality of the incoming RTP media stream without altering any characteristics of an outgoing RTP media stream from the contact center to the potential fraudulent contact; and
    receiving, by the processor of the contact center, an altered incoming RTP media stream associated with the potential fraudulent contact.
2. The method of claim 1, wherein altering the at least one characteristic of the incoming RTP media stream in real time comprises requesting a change in a codec type.
3. The method of claim 1, wherein:
    receiving the incoming RTP media stream comprises receiving a pulse code modulated stream; and
    altering the at least one characteristic of the incoming RTP media stream comprises increasing at least one of a sampling rate and a bit-depth.
4. The method of claim 1, further comprising:
    maintaining, by the processor of the contact center, the altered incoming RTP media stream and the outgoing RTP media stream as two separate streams.
5. The method of claim 1, further comprising:
    automatically scheduling and initiating, by the processor of the contact center, based on a security risk associated with the contact, at least one subsequent communications session with a user device associated with the contact; and
    receiving, by the processor of the contact center, a subsequent incoming RTP media stream during each subsequent communications session, wherein each subsequent incoming RTP media stream comprises at least one of an audio stream or a video stream.
6. The method of claim 5, further comprising:
    performing, by the processor of the contact center, at least one additional biometric analysis on biometric data extracted from each subsequent incoming RTP media stream.
7. The method of claim 6, further comprising:
    altering, by the processor of the contact center, at least one characteristic related to one or more of an audio quality or a video quality of the subsequent incoming RTP media stream without altering any characteristics of an outgoing RTP media stream from the contact center to the user device; and
    receiving, by the processor of the contact center, an altered subsequent incoming RTP media stream.
8. The method of claim 1, wherein altering the at least one characteristic of the incoming RTP media stream comprises requesting a change to a setting of a camera of a user device associated with the potential fraudulent contact.
9. The method of claim 1, wherein the real-time biometric analysis of the incoming RTP media stream comprises:
    capturing, by the processor, biometric data from the incoming RTP media stream; and
    comparing, by the processor of the contact center, the captured biometric data to historical biometric data associated with the contact.
10. The method of claim 1, further comprising:
    performing, by the processor of the contact center, at least one additional real-time biometric analysis of the altered incoming RTP media stream associated with the potential fraudulent contact.
11. A system for detecting fraud in a contact center, the system comprising:
    a memory device, storing executable instructions;
    a processor in communication with the memory device, the processor when executing the executable instructions:
        receives an incoming Real-Time Transport Protocol (RTP) media stream associated with a contact, wherein the incoming RTP media stream comprises at least one of an audio stream or a video stream;
        determines, based on a real-time biometric analysis of the incoming RTP media stream, that the contact is a potential fraudulent contact;
        alters, in real time, at least one characteristic related to one or more of an audio quality or a video quality of the incoming RTP media stream without altering any characteristics of an outgoing RTP media stream from the contact center to the potential fraudulent contact; and
        receives an altered incoming RTP media stream associated with the potential fraudulent contact.
12. The system of claim 11, wherein altering the at least one characteristic of the incoming RTP media stream in real time comprises requesting a change in a codec type.
13. The system of claim 11, wherein:
    receiving the incoming RTP media stream comprises receiving a pulse code modulated stream; and altering the at least one characteristic of the incoming RTP media stream comprises increasing at least one of a sampling rate and a bit-depth.

14. The system of claim 11, wherein the processor when executing the executable instructions:
maintains the altered incoming RTP media stream and the outgoing RTP media stream as two separate streams.

15. The system of claim 11, wherein the processor when executing the executable instructions:
automatically schedules and initiates, based on a security risk associated with the contact, at least one subsequent communications session with a user device associated with the contact; and
receives a subsequent incoming RTP media stream during each subsequent communications session, wherein each subsequent incoming RTP media stream comprises at least one of an audio stream or a video stream.

16. The system of claim 15, wherein the processor when executing the executable instructions:
performs at least one additional biometric analysis on biometric data extracted from each subsequent incoming RTP media stream.

17. The system of claim 16, wherein the processor when executing the executable instructions:
alters at least one characteristic related to one or more of an audio quality or a video quality of the subsequent incoming RTP media stream without altering any characteristics of an outgoing RTP media stream from the contact center to the user device; and
receives an altered subsequent incoming RTP media stream.

18. The system of claim 11, wherein altering the at least one characteristic of the incoming RTP media stream comprises requesting a change to a setting of a camera of a user device associated with the potential fraudulent contact.

19. The system of claim 11, wherein the real-time biometric analysis of the incoming RTP media stream comprises:
capturing biometric data from the incoming RTP media stream; and
comparing the captured biometric data to historical biometric data associated with the contact.

20. The system of claim 11, wherein the processor when executing the executable instructions:
performs at least one additional real-time biometric analysis of the altered incoming RTP media stream associated with the potential fraudulent contact.

* * * * *